(12) United States Patent
Enomoto

(10) Patent No.: US 6,560,035 B2
(45) Date of Patent: May 6, 2003

(54) ZOOM LENS SYSTEM

(75) Inventor: Takashi Enomoto, Chiba (JP)

(73) Assignee: Pentax Corporation, Tokyo (JP)

( * ) Notice: Subject to any disclaimer, the term of this patent is extended or adjusted under 35 U.S.C. 154(b) by 68 days.

(21) Appl. No.: 09/791,890

(22) Filed: Feb. 26, 2001

(65) Prior Publication Data

US 2002/0141073 A1 Oct. 3, 2002

(30) Foreign Application Priority Data

Jan. 24, 2001 (JP) ........................... 2001-015741

(51) Int. Cl.$^7$ ............................................. G02B 15/14
(52) U.S. Cl. ........................................ 359/682; 359/689
(58) Field of Search ................. 359/689, 690, 359/682, 684

(56) References Cited

U.S. PATENT DOCUMENTS

| | | | |
|---|---|---|---|
| 4,917,482 A | 4/1990 | Ito | 359/690 |
| 4,984,877 A | 1/1991 | Ito | 359/692 |
| 5,572,276 A | 11/1996 | Hirakawa | 359/684 |
| 5,585,970 A | * 12/1996 | Shibayama | 359/686 |
| 5,793,535 A | * 8/1998 | Ito et al. | 359/689 |
| 6,028,714 A | 2/2000 | Koyama | 359/683 |

FOREIGN PATENT DOCUMENTS

JP          8-146296          6/1996

\* cited by examiner

*Primary Examiner*—Scott J. Sugarman
(74) *Attorney, Agent, or Firm*—Greenblum & Bernstein, P.L.C.

(57) ABSTRACT

A zoom lens system including a negative first lens group, a positive second lens group, and a negative third lens group. Zooming is performed by moving the first through third lens. The negative first lens group includes positive-negative cemented lens elements, and the most object-side surface thereof is a concave surface. The zoom lens system satisfies: $-1 < r1/fW < 0$ ... (1); $1.4 < f1G/f1N < 1.8$ ... (2); wherein r1: the radius of curvature of the most object-side surface of the first lens group; fW: the focal length of the entire zoom lens system at the short focal length extremity; f1G: the focal length of the first lens group; and f1N: the focal length of the lens element of the cemented lens elements.

8 Claims, 11 Drawing Sheets

F 5.6

—— d Line
······ g Line
- - - C Line

-1.0   1.0
SPHERICAL
ABERRATION

CHROMATIC
ABERRATION

W=36.9°

-0.05  0.05
LATERAL
CHROMATIC
ABERRATION

W=36.9°

—— S
- - M

-1.0   1.0
ASTIGMATISM

W=36.9°

-5.0(%) 5.0
DISTORTION

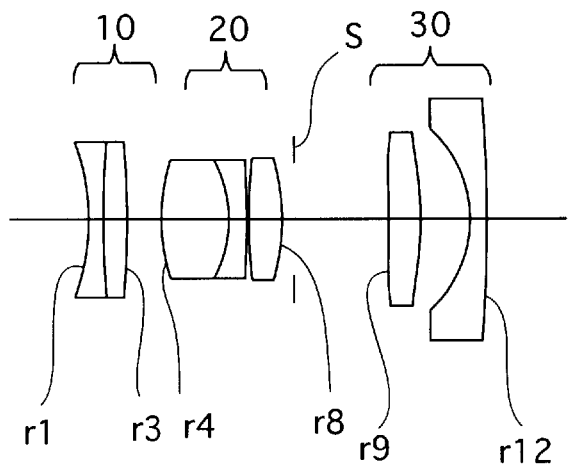
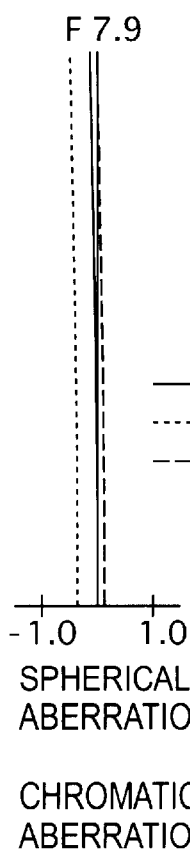
Fig.4A
F 7.9
—— d Line
······ g Line
---- C Line
-1.0  1.0
SPHERICAL
ABERRATION
CHROMATIC
ABERRATION
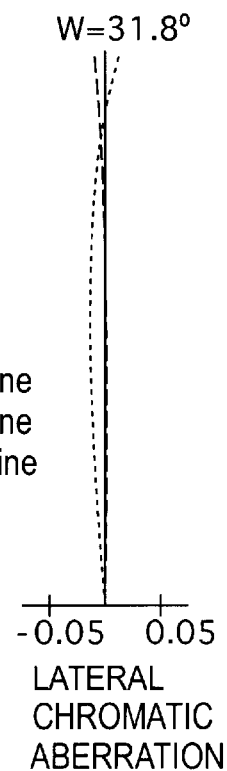
Fig.4B
W=31.8°
-0.05  0.05
LATERAL
CHROMATIC
ABERRATION
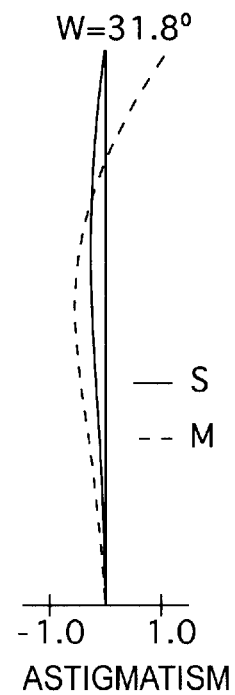
Fig.4C
W=31.8°
— S
-- M
-1.0  1.0
ASTIGMATISM
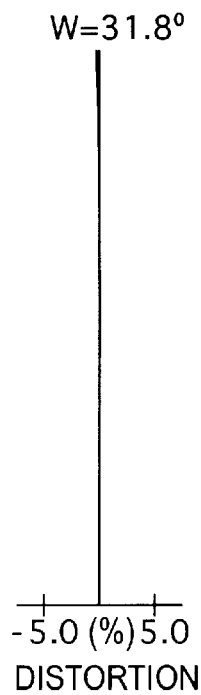
Fig.4D
W=31.8°
-5.0 (%) 5.0
DISTORTION

F 7.7

——— d Line
········· g Line
― ― ― C Line

-1.0    1.0
SPHERICAL
ABERRATION

CHROMATIC
ABERRATION

W=17.0°

-0.05   0.05
LATERAL
CHROMATIC
ABERRATION

W=17.0°

——— S
― ― M

-1.0   1.0
ASTIGMATISM

W=17.0°

-5.0 (%) 5.0
DISTORTION

F12.8

— d Line
······ g Line
--- C Line

-1.0  1.0
SPHERICAL
ABERRATION

CHROMATIC
ABERRATION

W=10.4°

-0.05  0.05
LATERAL
CHROMATIC
ABERRATION

W=10.4°

— S
-- M

-1.0  1.0
ASTIGMATISM

W=10.4°

-5.0 (%) 5.0
DISTORTION

Fig.9
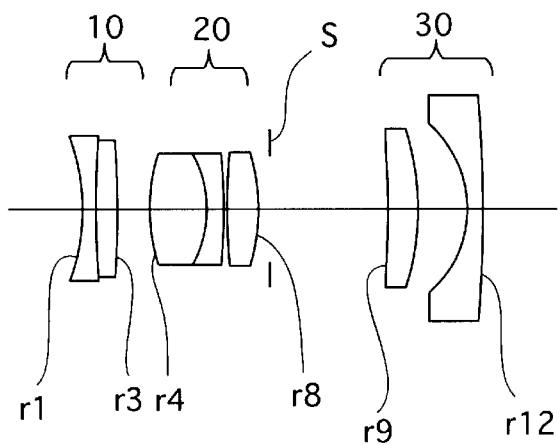
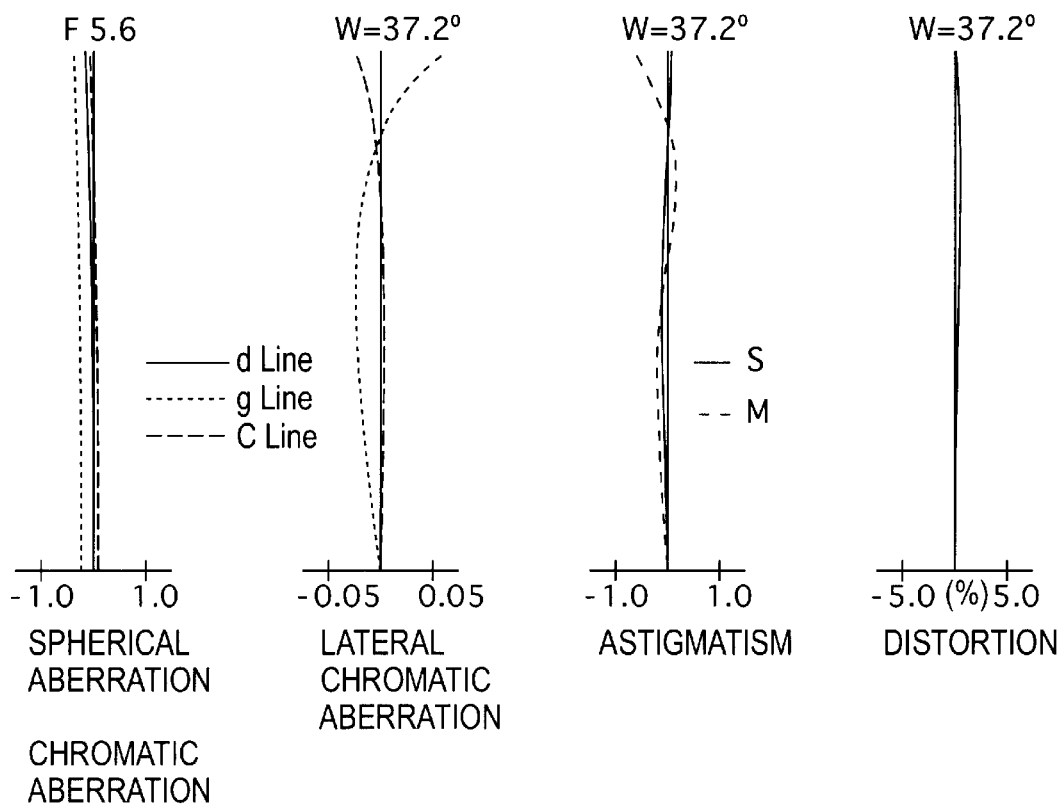
Fig.10A  Fig.10B  Fig.10C  Fig.10D
F 5.6   W=37.2°   W=37.2°   W=37.2°
-1.0  1.0   -0.05  0.05   -1.0  1.0   -5.0 (%) 5.0
SPHERICAL ABERRATION
CHROMATIC ABERRATION
LATERAL CHROMATIC ABERRATION
ASTIGMATISM
DISTORTION
— d Line
······ g Line
---- C Line
— S
-- M

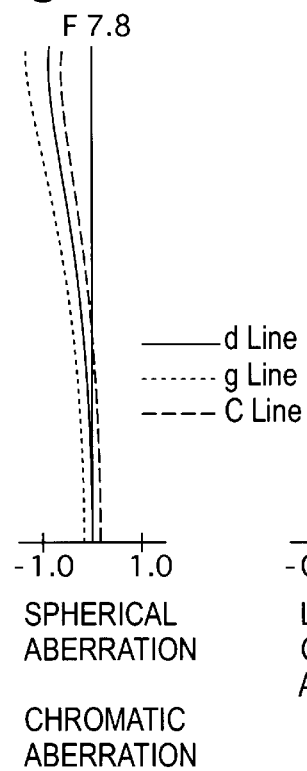
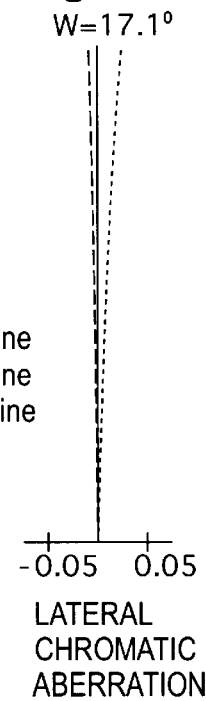
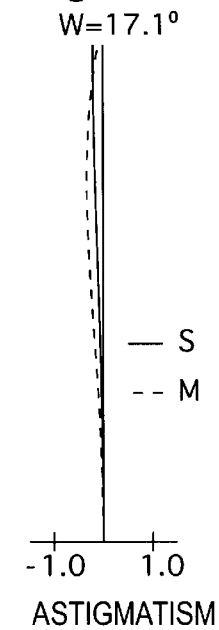
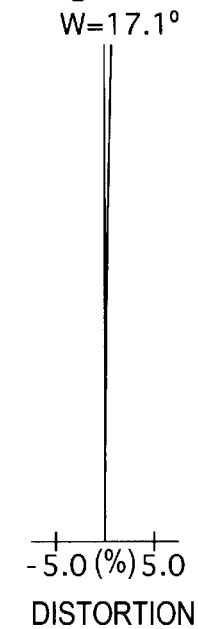
Fig.11A  Fig.11B  Fig.11C  Fig.11D
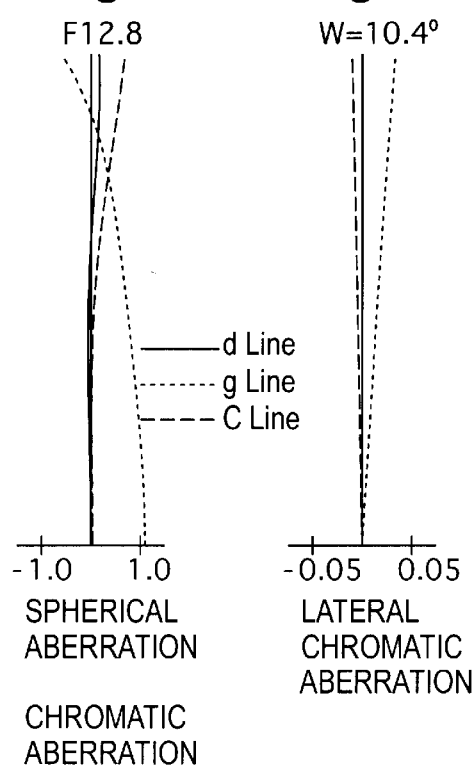
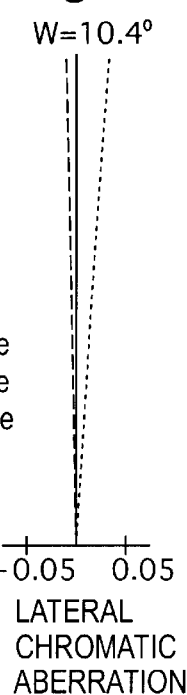
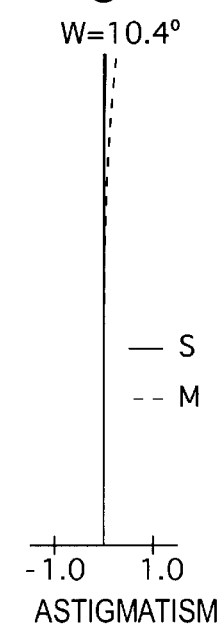
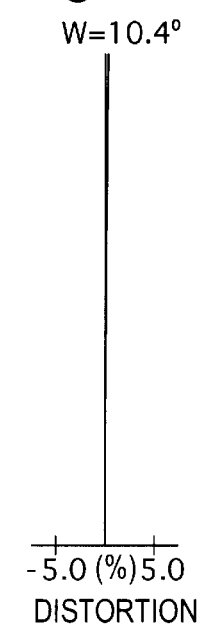
Fig.12A  Fig.12B  Fig.12C  Fig.12D Fig. 13
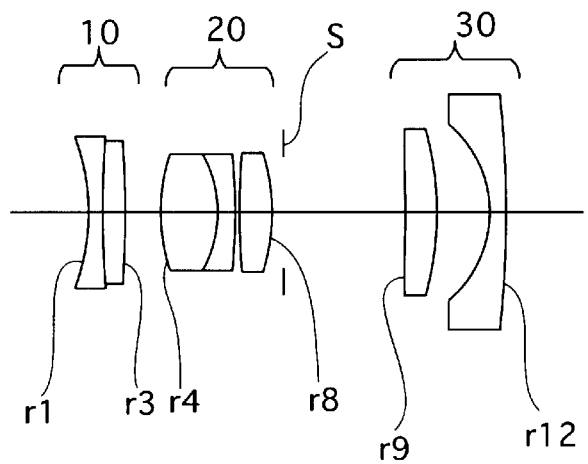
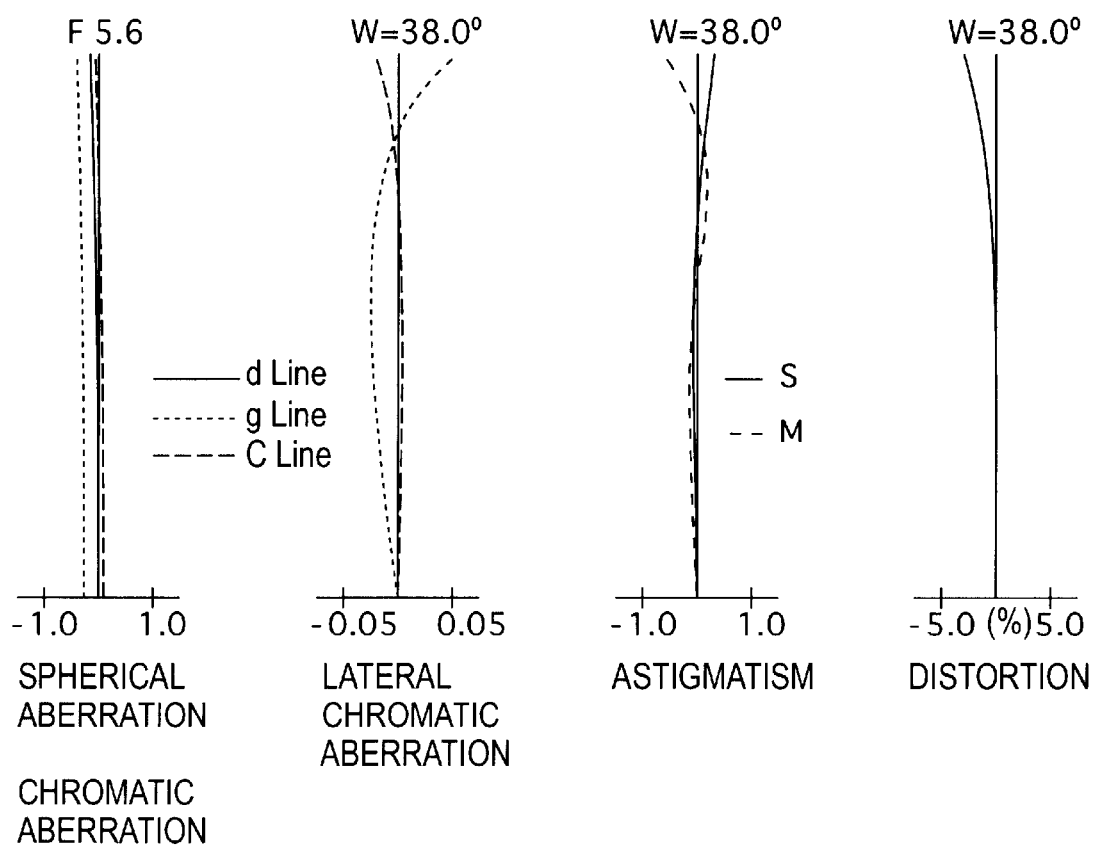
Fig. 14A  Fig. 14B  Fig. 14C  Fig. 14D

F 7.8

-1.0  1.0
SPHERICAL
ABERRATION
CHROMATIC
ABERRATION

— d Line
······ g Line
---- C Line

W=17.1°

-0.05  0.05
LATERAL
CHROMATIC
ABERRATION

W=17.1°

-1.0  1.0
ASTIGMATISM

— S
-- M

W=17.1°

-5.0 (%) 5.0
DISTORTION

F 12.8

-1.0  1.0
SPHERICAL
ABERRATION
CHROMATIC
ABERRATION

— d Line
······ g Line
---- C Line

W=10.4°

-0.05  0.05
LATERAL
CHROMATIC
ABERRATION

W=10.4°

-1.0  1.0
ASTIGMATISM

— S
-- M

W=10.4°

-5.0 (%) 5.0
DISTORTION

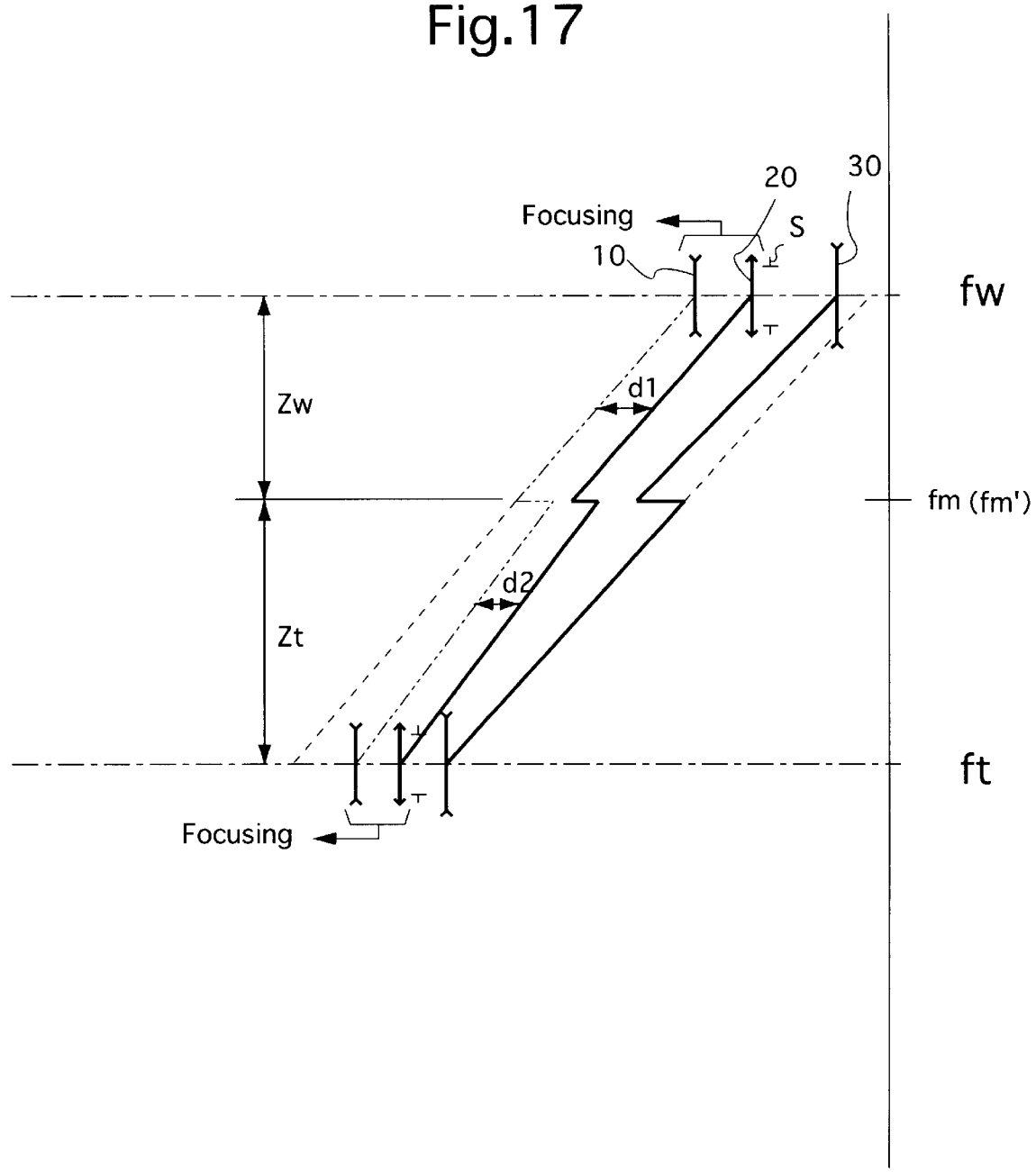

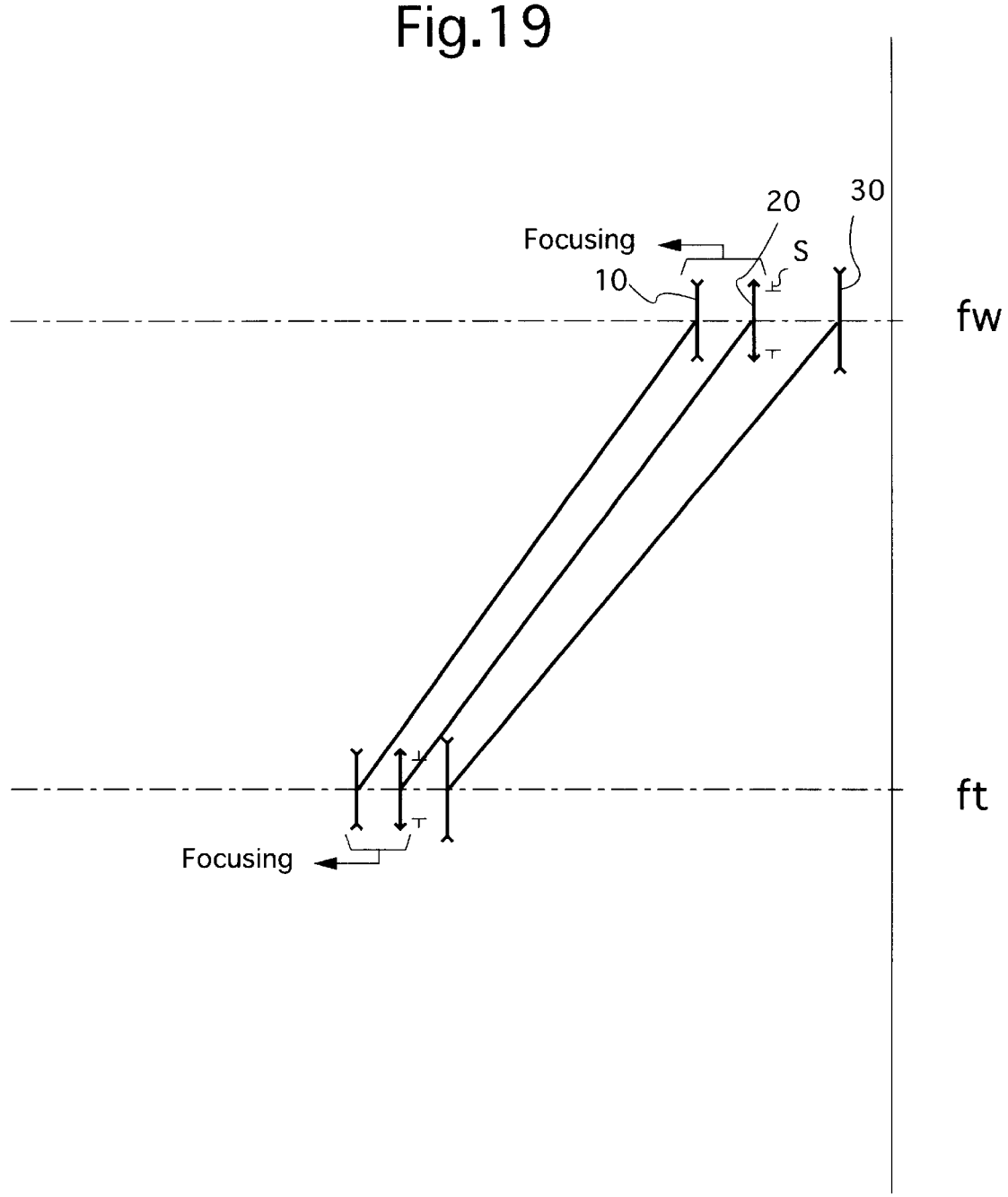

ZOOM LENS SYSTEM

BACKGROUND OF THE INVENTION

1. Field of the Invention

The present invention relates to a three-lens-group zoom lens system for a compact camera, and in particular, relates to increasing the zoom ratio of such a zoom lens system.

2. Description of the Related Art

In a zoom lens system for a compact camera, a long back focal distance is not necessary, unlike a zoom lens system of a single lens reflex (SLR) camera which requires a space to provide a mirror behind the lens system. Therefore in a compact camera, a telephoto-type lens system, including a positive lens group and a negative lens group, in this order from the object, is generally used. On the other hand, in a single lens reflex camera, a retrofocus-type lens system, including a negative lens group and a positive lens group, in this order from the object, is used.

In a compact camera, the zoom ratio of the telephoto-type zoom lens system is conventionally at most 2 to 3 in the case of the three-lens-group arrangement. Moreover, a three-lens-group zoom lens system having a zoom ratio of 4.0 or more has not been known.

SUMMARY OF THE INVENTION

It is an object of the present invention to provide a three-lens-group zoom lens system for a compact camera, which can attain a high zoom ratio of 4.0 or more.

In order to achieve the above-mentioned object, there is provided a zoom lens system including a negative first lens group, a positive second lens group, and a negative third lens group, in this order from the object. Zooming is performed by moving the first through third lens groups in the optical axis direction. The negative first lens group includes positive-and-negative cemented lens elements in which the most object-side surface is a concave surface. The zoom lens system satisfies the following conditions:

$$-1 < r1/fW < 0 \quad (1)$$

$$1.4 < f1G/f1N < 1.8 \quad (2)$$

wherein r1 designates the radius of curvature of the most object-side surface of the negative first lens group;

fW designates the focal length of the entire zoom lens system at the short focal length extremity;

f1G designates the focal length of the negative first lens group; and f1N designates the focal length of the negative lens element of the cemented lens elements of the negative first lens group.

In the cemented lens elements, the order of the positive lens element and the negative lens element is not specifically required. Accordingly, the cemented lens elements can be constituted by the negative lens element and the positive lens element in this order from the object.

The zoom lens system according to the present invention preferably satisfies the following condition:

$$8 < vn - vp \quad (3)$$

wherein vn designates the Abbe number of the negative lens element of the cemented lens elements of the negative first lens group; and vp designates the Abbe number of the positive lens element of the cemented lens elements of the negative first lens group.

The zoom lens system according to the present invention can satisfy the following condition:

$$-5 < fT/f1G < -3.5 \quad (4)$$

wherein fT designates the focal length of the entire zoom lens system at the long focal length extremity.

The zoom lens system according to the present invention preferably satisfies the following condition:

$$0.03 < (d12W - d12T)/fW < 0.10 \quad (5)$$

wherein d12W designates the distance between the first lens group and the second lens group at the short focal length extremity; and d12T designates the distance between the first lens group and the second lens group at the long focal length extremity.

The zoom lens system according to the present invention can satisfy the following condition:

$$0.6 < y/fW < 0.9 \quad (6)$$

wherein y designates the diagonal image heighton a film surface.

The zoom lens system according to the present invention preferably satisfies the following condition:

$$3.5 < fT/fW \quad (7)$$

The zoom lens system according to the present invention can attain a zoom ratio of 4 or more. On the other hand, the zoom lens system of the present invention can also be applied to a zoom lens system having a zoom ratio of about 3.5.

In the zoom lens system of the present invention, it is preferable that a lens element having at least one aspherical surface be provided in the positive second lens group, and the following condition be satisfies:

$$-30 < \Delta IASP < -10 \quad (8)$$

wherein $\Delta IASP$ designates the amount of change of the spherical aberration coefficient due to the aspherical surface under the condition that the focal length of the entire zoom lens system at the short focal length extremity is converted to 1.0.

Furthermore, in the zoom lens system of the present invention, it is preferable that a lens element having at least one aspherical surface be provided in the negative third lens group, and the following condition be satisfied:

$$0 < \Delta VASP < 0.4 \quad (9)$$

wherein $\Delta VASP$ designates the amount of change of the distortion coefficient due to the aspherical surface under the condition that the focal length of the entire zoom lens system at the short focal length extremity is converted (normalized) to 1.0.

The present disclosure relates to subject matter contained in Japanese Patent Application No. 2001-015741 (filed on Jan. 24, 2001) which is expressly incorporated herein by reference in its entirety.

Copending and commonly assigned U.S. Patent Application to "A Zoom Lens System", listing as an inventor Takashi ENOMOTO, filed concurrently with the present application, having Attorney docket No. P20342; and Japanese Patent Application No. 2000-047619 (filed on Feb. 24, 2000), from which the application designated by Attorney docket No. P20342 claims priority, are expressly incorporated herein by reference in their entireties.

BRIEF DESCRIPTION OF THE DRAWINGS

The invention will be discussed below in detail with reference to the accompanying drawings, in which:

FIG. 3 is a lens arrangement, at a first intermediate focal length, of the zoom lens system of the first embodiment;

FIGS. 4A, 4B, 4C and 4D show aberrations occurred in the lens arrangement shown in FIG. 3;

FIG. 9 is a lens arrangement, at the short focal length extremity, of the zoom lens system according to a second embodiment of the present invention;

FIGS. 10A, 10B, 10C and 10D show aberrations occurred in the lens arrangement of FIG. 9 at the short focal length extremity;

FIGS. 11A, 11B, 11C and 11D show aberrations occurred in the lens arrangement of FIG. 9 at the intermediate focal length;

FIGS. 12A, 12B, 12C and 12D show aberrations occurred in the lens arrangement of FIG. 9 at the long focal length extremity;

FIG. 13 is a lens arrangement, at the short focal length extremity, of the zoom lens system according to a third embodiment of the present invention;

FIGS. 14A, 14B, 14C and 14D show aberrations occurred in the lens arrangement of FIG. 13 at the short focal length extremity;

FIG. 17 is the schematic view of the lens-group moving paths for the zoom lens system according to the first embodiment;

FIG. 19 is the schematic view of the lens-group moving paths for the zoom lens system according to the second and third embodiments.

DESCRIPTION OF THE PREFERRED EMBODIMENTS

Figure 18:
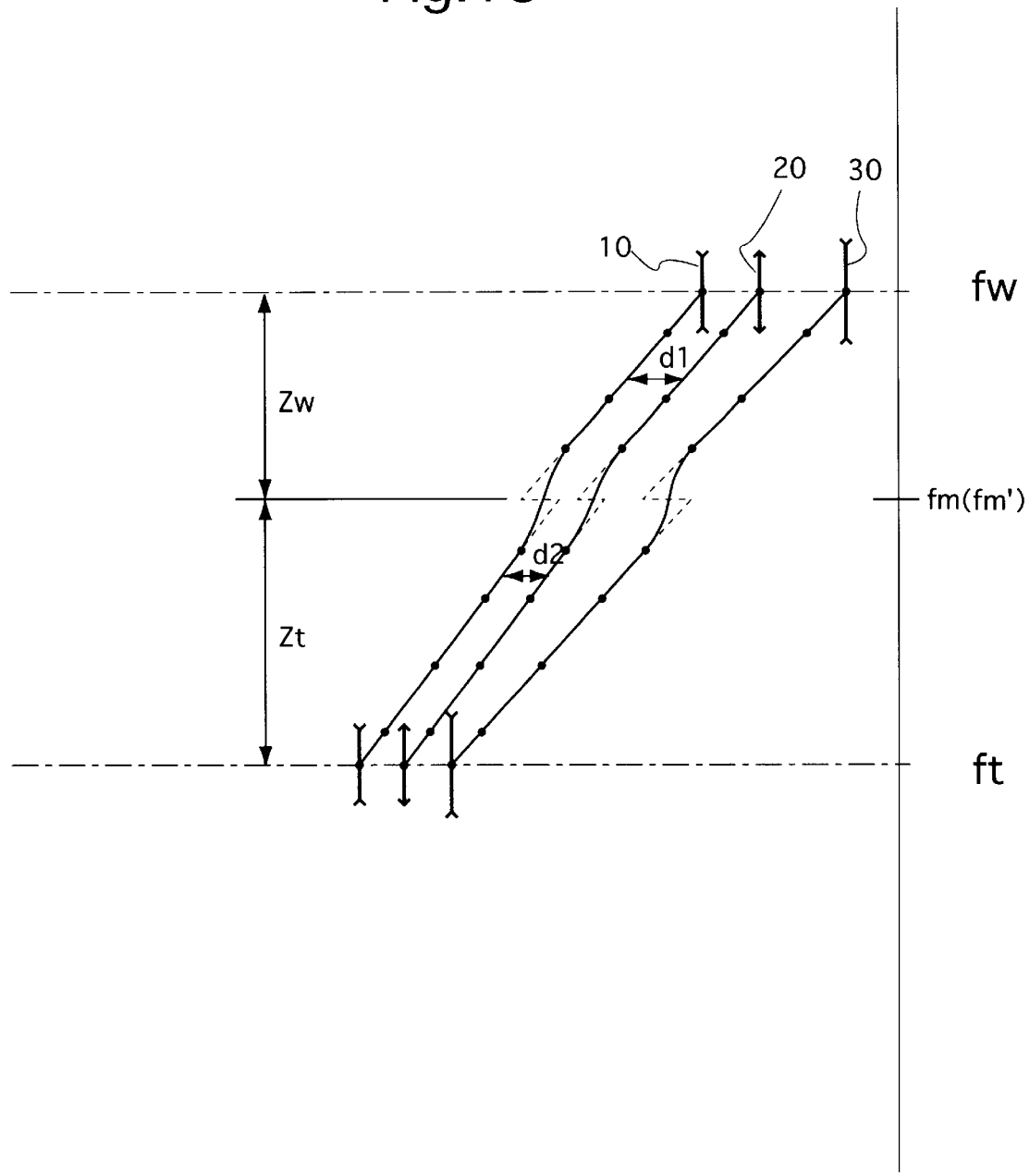
FIG. 18 is another schematic view of the lens-group moving paths for the zoom lens system according to the first embodiment.

As shown in the lens-group moving paths of FIGS. 17 through 19, the three-lens-group zoom lens system for a compact camera includes a negative first lens group 10, a positive second lens group 20 and a negative third lens group 30, in this order from the object; and zooming is performed by moving the first through third lens group in the optical axis direction.

Among the schematic views of the lens-group moving paths of FIGS. 17 through 19, FIG. 17 is an example of the lens-group moving paths along which there is a switching movement of the lens groups at the intermediate focal length. According to FIG. 17, zooming from the short focal length extremity fw toward the long focal length extremity ft the lens groups 10 through 30 are arranged to move as follows:

In a focal-length range Zw (the first focal length range; the short-focal-length side zooming range) from the short focal length extremity fw to the intermediate focal length fm, the first lens group 10, the second lens group 20 and the third lens group 30 are moved toward the object.

At the intermediate focal length fm, the first lens group 10, the second lens group 20 and the third lens group 30 are moved towards the image plane by a predetermined distance, so that the intermediate focal length fm is changed to an after-switching intermediate focal length fm'.

In a focal-length range Zt (the second focal length range; the long-focal-length side zooming range) from the after-switching intermediate focal length fm' to the long focal length extremity ft, the first lens group 10, the second lens group 20 and the third lens group 30 are moved towards the object. In the focal-length range Zw, the first lens group 10 and the second lens group 20 maintains a predetermined distance therebetween (the first state).

At the intermediate focal length fm, the distance between the first lens group 10 and the second lens group 20 is reduced.

In the focal-length range Zt, the first lens group 10 and the second lens group 20 maintains the reduced distance therebetween (the second state).

The intermediate focal length fm belongs to the fist focal length range; and the after-switching intermediate focal length fm' is determined after the following movement of the lens groups is completed:

(i) the first lens group 10 and the third lens group 30 are moved from the positions thereof, corresponding to the intermediate focal length fm, toward the image; and (ii) the first lens group 10 and the second lens group 20 reduce the distance therebetween.

Upon zooming, an aperture stop S moves together with the second lens group 20.

The first intermediate focal length of FIG. 3 is a typical focal length in the focal length range Zw.

Figure 1:
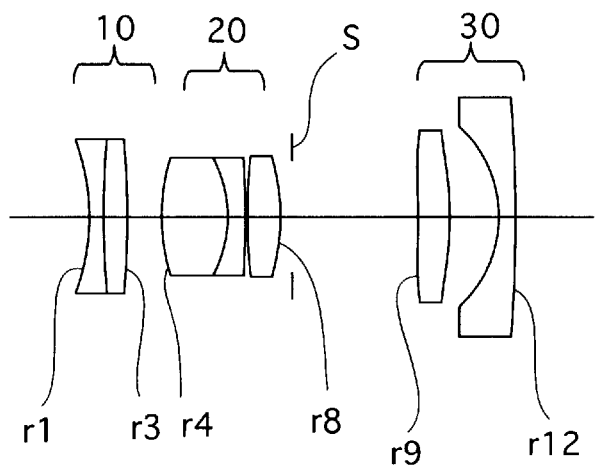
FIG. 1 is a lens arrangement, at the short focal length extremity, of the zoom lens system according to a first embodiment of the present invention.
Figure 2A:
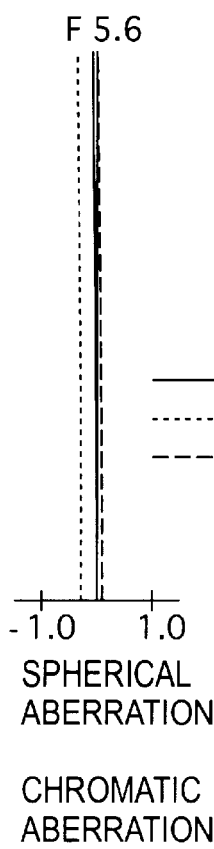
FIGS. 2A, 2B, 2C and 2D show aberrations occurred in the lens arrangement shown in FIG. 1.
Figure 2B:
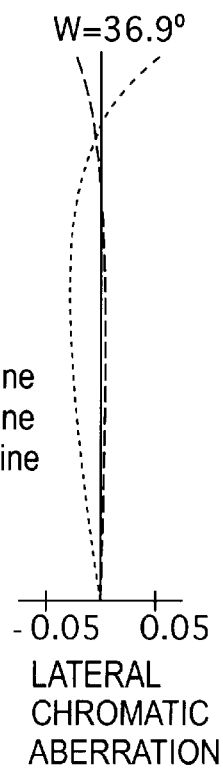
Figure 2C:
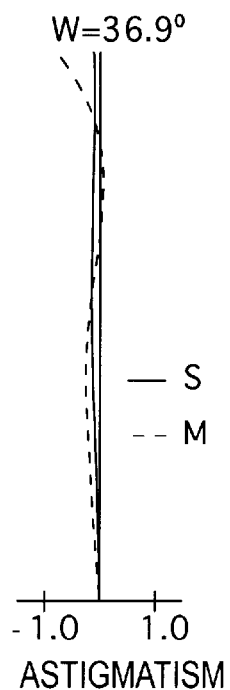
Figure 2D:
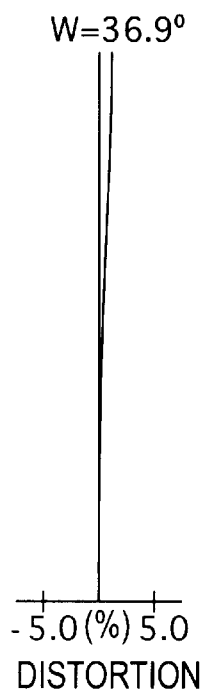
Figure 5:
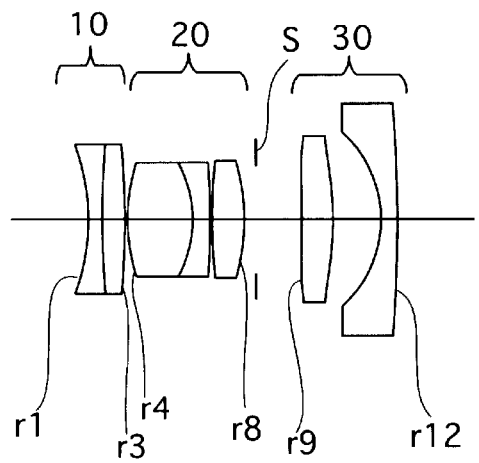
FIG. 5 is another lens arrangement, at a second intermediate focal length, of the zoom lens system of the first embodiment.
Figure 6A:
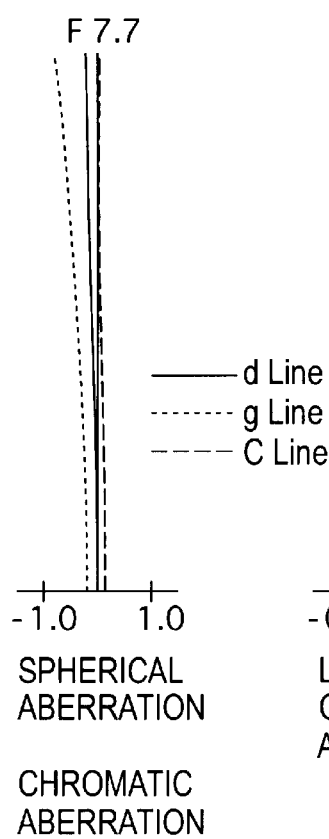
FIGS. 6A, 6B, 6C and 6D show aberrations occurred in the lens arrangement shown in FIG. 5.
Figure 6B:
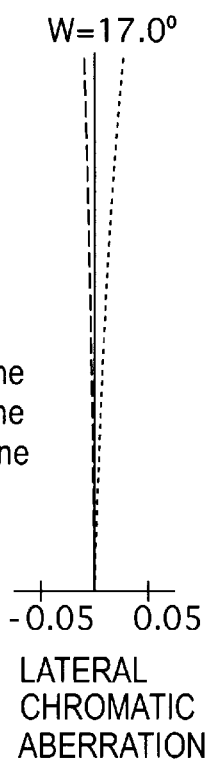
Figure 6C:
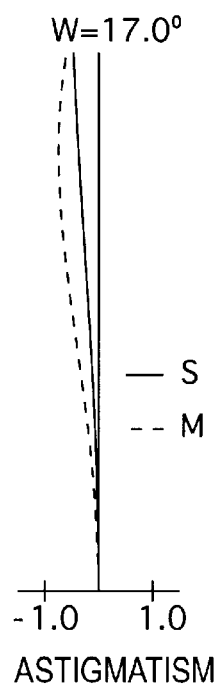
Figure 6D:
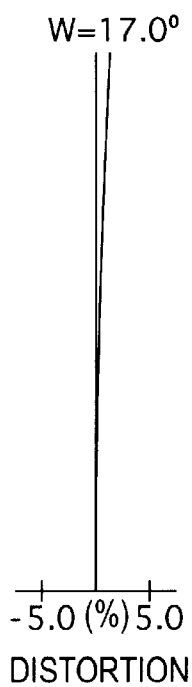
Figure 7:
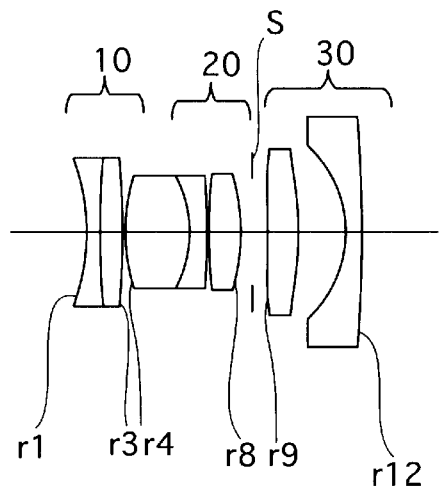
FIG. 7 is a lens arrangement, at the long focal length extremity, of the zoom lens system of the first embodiment.
Figure 8A:
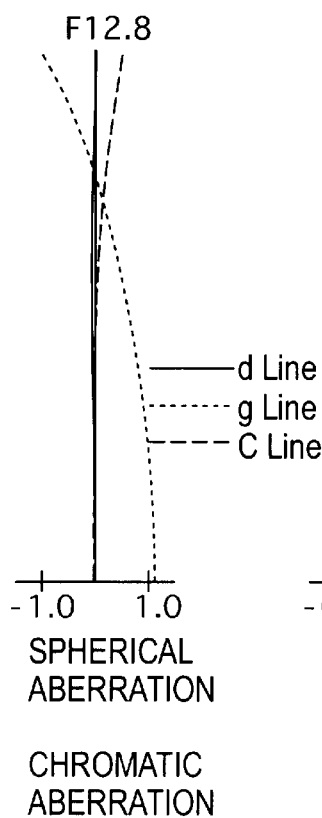
FIGS. 8A, 8B, 8C and 8D show aberrations occurred in the lens arrangement shown in FIG. 7.
Figure 8B:
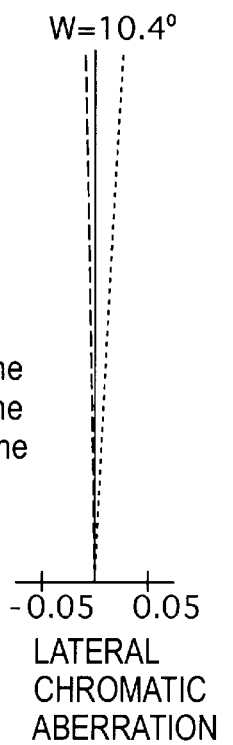
Figure 8C:
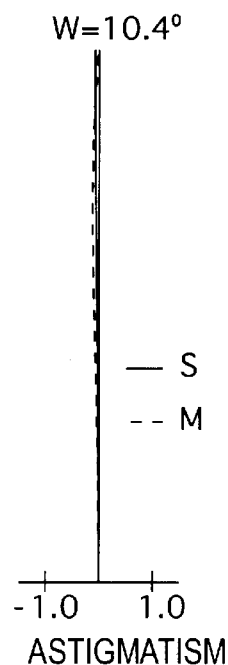
Figure 8D:
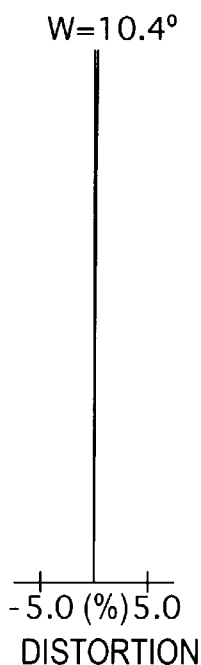
Figure 15A:
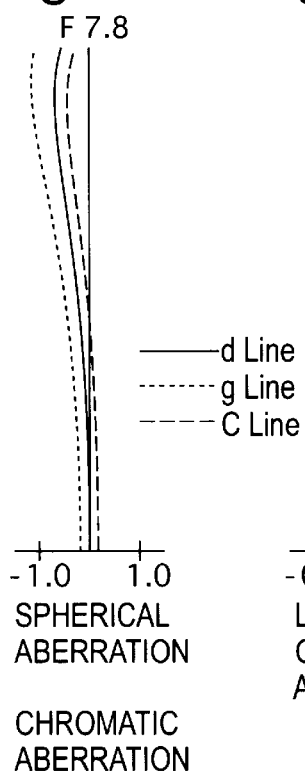
FIGS. 15A, 15B, 15C and 15D show aberrations occurred in the lens arrangement of FIG. 13 at the intermediate focal length.
Figure 15B:
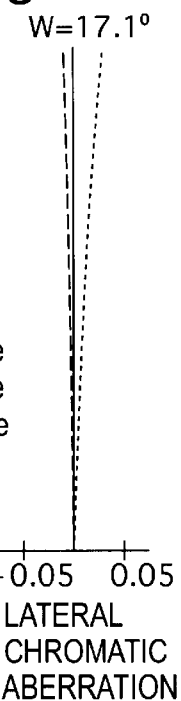
Figure 15C:
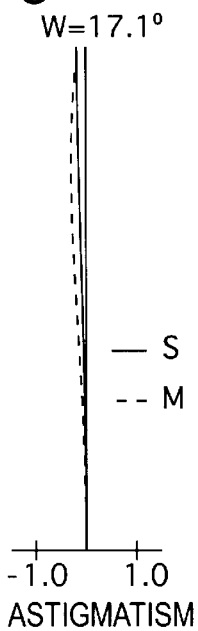
Figure 15D:
Figure 16A:
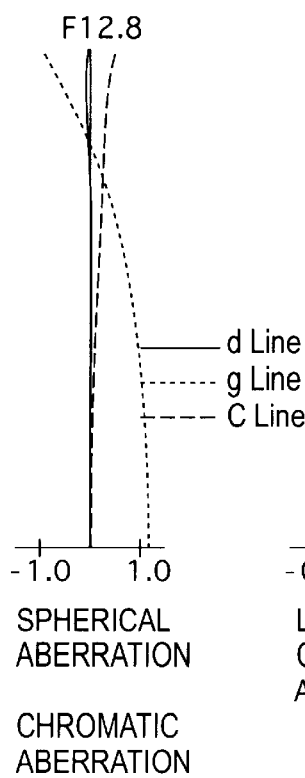
FIGS. 16A, 16B, 16C and 16D show aberrations occurred in the lens arrangement of FIG. 13 at the long focal length extremity.
Figure 16B:
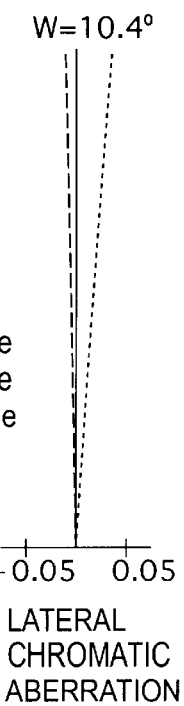
Figure 16C:
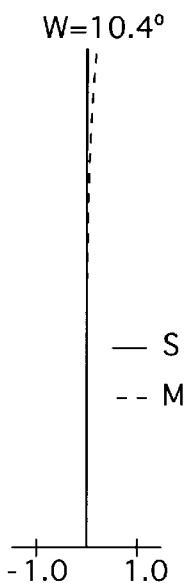
Figure 16D:
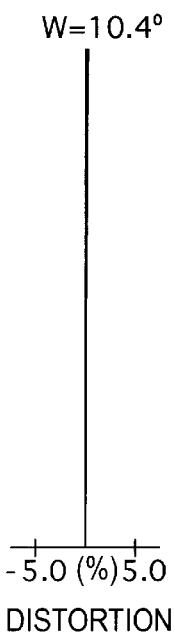

The second intermediate focal length of FIG. 5 is a typical focal length in the focal length range Zt.

The lens-group-moving paths, before and after the switching movement, for the first through third lens groups 10, 20 and 30 shown in FIG. 17 are simply depicted as straight lines. It should however be noted that actual lens-group-moving paths are not necessarily straight lines. Furthermore, focusing is performed by integrally moving the first lens group 10 and the second lens group 20 regardless of the focal length ranges.

The lens-group-moving paths have discontinuities at the intermediate focal length fm and the after-switching intermediate focal length fm'; however, by adequately determining the positions of the first lens group 10, the second lens group 20 and the third lens group 30 respectively at the short focal length extremity fw, the intermediate focal length fm, the after-switching intermediate focal length fm' and the long focal length extremity ft, solutions by which an image is correctly formed on a predetermined plane can be obtained. According to the lens-group-moving paths with these solutions, a zoom lens system which is miniaturized and has a high zoom ratio can be obtained.

FIG. 18 shows that positions for stopping each lens group are determined in a stepwise manner along the lens-group-moving paths of FIG. 17; and positions at which each lens group is to be stopped are indicated with black dots, and the dots are connected by smooth curved lines. In an actual mechanical structure, each lens group can be moved along such smooth curved lines.

FIG. 19 shows an example of the lens-group moving paths which have no intermediate-switching focal length. Upon zooming from the short focal length extremity toward the long focal length extremity, all the lens groups move toward the object, while the distances therebetween are varied. The aperture stop S is provided between the second lens group 20 and the third lens group 30, and moves together with the second lens group 20.

In the embodiments of the three-lens-group zoom lens system in which lens-group moving paths (zooming basic paths), e.g., the ones explained above, can be made, a feature is that the negative first lens group 10 is constituted by the positive-and-negative cemented lens elements in which the most object-side surface (the first surface) is a concave surface. The order of the positive lens element and the negative lens element is not specifically required.

In particular, in the case of the three-lens-group zoom lens system with a half angle-of-view of 35 or more at the short focal length extremity, if the number of lens elements constituting the first lens group is large, and if the overall length of the first lens group is long, the diameters of the first and second lens groups tend to be larger in order to collect peripheral illumination. However, an increase of the lens-element diameter causes an increase of the up-to-down dimension of a camera, and hinders miniaturization thereof.

Constituting the negative first lens group 10 by the positive-and-negative cemented lens elements in which the most object-side surface is a concave surface can secure peripheral illumination, and can avoid an increase of the diameter of the front (first and second) lens group. The three-lens-group zoom lens system in the embodiments can also be used for a lens system which does not have a large half angle-of-view at the short focal length extremity.

Condition (1) specifies the cemented lens elements in order to reduce the overall length of the first lens group, under the condition that the negative first lens group 10 is constituted by the positive-and-negative cemented lens elements in which the most object-side surface is a concave surface. By satisfying this condition, peripheral illumination can be secured, and an increase of the diameter of the front lens group can be prevented.

If r1/fW exceeds the upper limit of condition (1), requirements to form the first surface as a concave surface are not satisfied, thereby peripheral illumination cannot be secured.

If r1/fW exceeds the lower limit of condition (1), the effects of divergence of the first surface becomes small, thereby the diameter of the front (first) lens group becomes large in order to collect peripheral illumination.

Condition (2) specifies the negative lens element of the negative first lens group constituted by the cemented lens elements. By satisfying this condition, aberrations in the first lens group can be reduced, and fluctuations of aberrations over the entire zoom lens system can be reduced.

If f1G/f1N exceeds the upper limit of condition (2), the divergence of the cemented lens elements which as a whole has negative power becomes too large, thereby spherical aberration occurred in the entire zoom lens system tends to be overcorrected.

If f1G/f1N exceeds the lower limit of condition (2), the divergence of the cemented lens elements which as a whole has negative power becomes small, thereby spherical aberration occurred in the entire zoom lens system tends to be undercorrected.

Condition (3) is for correcting chromatic aberration over the entire zooming range.

If vn−vp exceeds the lower limit of condition (3), chromatic aberration over the entire zooming range cannot be corrected by the cemented lens elements.

Condition (4) specifies the traveling distance of the first lens group. This condition is necessary in order to reduce the traveling distance of the first lens group so that miniaturization of the zoom lens system is attained while the zoom ratio of 4 or more is maintained.

If fT/f1G exceeds the upper limit of condition (4), the traveling distance of the negative first lens group becomes longer, so that miniaturization of the zoom lens system cannot be attained.

If fT/f1G exceeds the lower limit of condition (4), the power of the negative first lens group becomes too strong, so that aberrations occurred therein become large, and fluctuations of aberrations upon zooming become large.

Condition (5) is for reducing the diameters of the first and second lens groups. This condition is necessary, because if the traveling distances of the first and second lens groups become long, and if the distance therebetween also becomes long in order to maintain the zoom ratio of 4 or more, the diameters of the first and second lens groups tend to be large in order to collect peripheral illumination at the short focal length extremity in particular.

If (d12W−d12T)/fW exceeds the upper limit of condition (5), the traveling distances of the first and second lens groups become long, so that miniaturization of the zoom lens system cannot be attained.

If (d12W−d12T)/fW exceeds the lower limit of condition (5), zooming effects of the first and second lens groups are small, so that a high zoom ratio cannot be attained.

Condition (6) is for making the focal length at the short focal length extremity shorter.

If y/fW exceeds the lower limit of condition (6), the focal length at the short focal length extremity cannot be made shorter.

Condition (7) is for attaining the zoom ratio of 3.5 or more.

If fT/fW exceeds the lower limit of condition (7), a zoom lens system with the zoom ratio of 3.5 or more cannot be attained.

Condition (8) for specifying requirements to be satisfied by an aspherical surface in the case where the positive second lens group is provided with a lens element on which at lease one aspherical surface is formed. By using one lens element on which at lease one aspherical surface is formed, the number of lens elements of the positive second lens group can be reduced, and in particular, spherical aberration of the zoom lens system can be corrected.

If ΔIASP exceeds the upper limit of condition (8), the effects of the correcting of spherical aberration are small, so that spherical aberration cannot be corrected sufficiently.

If ΔIASP exceeds the lower limit of condition (8), the amount of asphericity is large, so that manufacturing of the lens element with the aspherical surface becomes difficult.

Condition (9) is for specifying requirements to be satisfied by an aspherical surface in the case where the negative third lens group is provided with a lens element on which at lease one aspherical surface is formed. By using one lens element on which at lease one aspherical surface is formed, the number of lens elements of the negative third lens group can be reduced, and in particular, distortion at the short focal length extremity can be corrected.

If ΔVASP exceeds the upper limit of condition (9), the amount of asphericity becomes large, so that manufacturing of the lens element with the aspherical surface becomes difficult.

If ΔVASP exceeds the lower limit of condition (9), the effects of the correcting of distortion by the aspherical surface are small, so that distortion cannot be corrected sufficiently.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, Fno designates the F-number, f designates the focal length of the entire zoom lens system, W designates the half angle-of-view ( ), fB designates the back focal distance, r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

The relation between the aspherical coefficients and the aberration coefficients will be herein discussed.

1. The shape of the aspherical surface can be generally defined as follows:

$$cy^2/(1+[-1\{1+K\}c^2y^2]^{1/2})+A4y^4+A6y^6+A8y^8+A10y^{10}\ldots$$

wherein:
x designates a distance from a tangent plane of an aspherical vertex;
y designates a distance from the optical axis;
c designates a curvature of the aspherical vertex (1/r),
K designates a conic constant;

2. In this equation, to obtain the aberration coefficients, the following substitution is made to replace K with "0" (Bi=Ai when K=0).

B4=A4+Kc³/8;
B6=A6+(K²+2K)c⁵/16;
B8=A8+5(K³+3K²+3K)c⁷/128
B10=A10+7(K⁴+4K³+6K²+4K)c⁹/256; and therefore, the following equation is obtained:

$$x=cy^2/[1+[1-c^2y^2]^{1/2}]+B4y^4+B6y^6+B8y^8+B10y^{10}+\ldots$$

3. Furthermore, in order to normalize the focal length f to 1.0, the followings are considered:

X=x/f; Y=y/f; C=f*c;
α4=f³B4; α6=f⁵B6; α8=f⁷B8; α10=f⁹B10
Accordingly, the following equation is obtained.

$$X=CY^2/[1+[1-C^2Y^2]^{1/2}]+\alpha 4Y^4+\alpha 6Y^6+\alpha 8Y^8+\alpha 10Y^{10}+\ldots$$

4. Φ=8(N'-N)α4 is defined, and the third aberration coefficients are defined as follows:
I designates the spherical aberration coefficient;
II designates the coma coefficient;
III designates the astigmatism coefficient;
IV designates the curvature coefficient of the sagittal image surface; and
V designates a distortion coefficient; and therefore, the influence of the fourth-order aspherical-surface coefficient (α4) on each aberration coefficient is defined as:

$$I=h^4\Phi$$

$$II=h^3k\Phi$$

$$III=h^2k^2\Phi$$

$$IV=h^2k^2\Phi$$

$$V=hk^3\Phi$$

wherein
h designates the height at which the paraxial on-axis ray strikes the aspherical surface;
k designates the height at which the paraxial off-axis ray passes through the center of the pupil;
N• designates the refractive index of a medium on the side of the image with respect to the aspherical surface; and
N designates the refractive index of a medium on the side of the object with respect to the aspherical surface.

[Embodiment 1]

FIGS. 1 through 8 show the zoom lens system according to the first embodiment. This embodiment is applied to the zoom lens system having the lens-group moving paths shown in FIG. 17 or FIG. 18. FIGS. 1, 3, 5 and 7 respectively show a lens arrangement of the zoom lens system at the short focal length extremity, at the intermediate focal length (f=35.0) in the short-focal-length side zooming range Zw, at the intermediate focal length (f=70.0) in the long-focal-length side zooming range Zt, and the long focal length extremity. FIGS. 2A, through 2D, FIGS. 4A through 4D, FIGS. 6A through 6D and FIGS. 8A through 8D show aberrations occurred in the lens arrangements shown in FIGS. 1, 3, 5 and 7. Table 1 shows the numerical data of the first embodiment.

Lens surface Nos. 1 through 3 constitute the negative first lens group 10, lens surface Nos. 4 through 8 constitute the positive second lens group 20, and lens surface Nos. 9 through 12 constitute the negative third lens group 30. The first lens group 10 includes positive-and-negative cemented lens elements in which the most object-side surface is a concave surface. The second lens group 20 includes cemented lens elements having a positive lens element and a negative lens element, in this order from the object, and a positive lens element. The third lens group 30 includes a positive lens element and a negative lens element, in this order from the object. The aperture stop S is positioned 1.0 mm behind the second lens group 20 (lens surface No. 8).

TABLE 1

$F_{NO} = 1:5.6$-$7.9$-$7.7$-$11.1$-$12.8$
$f = 28.50$-$35.00$-$70.00$-$105.00$-$118.00$
$W = 36.9°$-$31.8°$-$17.0°$-$11.6°$-$10.4°$
$f_B = 7.99$-$14.28$-$41.22$-$71.65$-$82.94$

| Surface No. | r | d | $N_d$ | ν |
|---|---|---|---|---|
| 1 | −18.550 | 1.20 | 1.78117 | 48.7 |
| 2 | 76.577 | 1.99 | 1.78560 | 39.6 |
| 3 | −76.577 | 2.90-2.90-0.25-0.25-0.25 | — | — |
| 4 | 16.660 | 5.65 | 1.48849 | 70.2 |
| 5 | −10.445 | 1.50 | 1.80100 | 35.0 |
| 6 | −78.741 | 0.18 | — | — |
| 7 | 47.914 | 2.80 | 1.72750 | 40.3 |
| 8* | −17.212 | 11.62-8.96-4.99-2.82-2.34 | — | — |
| 9* | −114.327 | 2.69 | 1.58547 | 29.9 |
| 10* | −27.961 | 4.14 | — | — |
| 11 | −10.298 | 1.40 | 1.78685 | 47.7 |
| 12 | −135.093 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.70277 \times 10^{-4}$ | $-0.51341 \times 10^{-7}$ | $-0.10357 \times 10^{-8}$ |
| 9 | 0.00 | $0.96011 \times 10^{-4}$ | $0.10920 \times 10^{-5}$ | $0.10440 \times 10^{-8}$ |
| 10 | 0.00 | $0.25227 \times 10^{-4}$ | $0.13145 \times 10^{-5}$ | |

[Embodiment 2]

FIGS. 9 through 12 show the zoom lens system according to the second embodiment. This embodiment is applied to the zoom lens system having the lens-group moving paths shown in FIG. 19. FIG. 9 shows the lens arrangement of the zoom lens system. FIGS. 10A through 10D, FIGS. 11A through 11D, and FIGS. 12A through 12D respectively show aberrations occurred in the lens arrangements at the short focal length extremity, at the intermediate focal length (f=70.0), and the long focal length extremity. Table 2 shows the numerical data of the second embodiment. The basic lens arrangement is the same as that of the first embodiment. The aperture stop S is positioned 1.0 mm behind the second lens group 20 (lens surface no. 8).

TABLE 2

$F_{NO} = 1:5.6$-$7.8$-$11.2$-$12.8$
$f = 28.50$-$70.00$-$105.00$-$118.00$
$W = 37.2°$-$17.1°$-$11.6°$-$10.4°$
$f_B = 7.99$-$42.82$-$71.53$-$82.11$

| Surface No. | r | d | $N_d$ | ν |
|---|---|---|---|---|
| 1 | −18.627 | 1.20 | 1.74330 | 49.3 |
| 2 | 88.739 | 1.92 | 1.70299 | 29.4 |
| 3 | −88.739 | 2.90-1.00-0.40-0.25 | — | — |

TABLE 2-continued $F_{NO} = 1:5.6$-$7.8$-$11.2$-$12.8$
$f = 28.50$-$70.00$-$105.00$-$118.00$
$W = 37.2°$-$17.1°$-$11.6°$-$10.4°$
$f_B = 7.99$-$42.82$-$71.53$-$82.11$

| Surface No. | r | d | $N_d$ | ν |
|---|---|---|---|---|
| 4 | 16.422 | 5.11 | 1.48749 | 70.2 |
| 5 | −10.291 | 1.50 | 1.84500 | 32.5 |
| 6 | −54.987 | 0.30 | — | — |
| 7 | 55.785 | 2.80 | 1.72750 | 40.3 |
| 8* | −16.552 | 11.56-4.57-2.92-2.55 | — | — |
| 9* | −62.140 | 2.69 | 1.58547 | 29.9 |
| 10 | −23.390 | 4.42 | — | — |
| 11 | −10.028 | 1.40 | 1.77500 | 49.3 |
| 12 | −124.701 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.70567 \times 10^{-4}$ | $31\ 0.28033 \times 10^{-6}$ | $0.35000 \times 10^{-8}$ |
| 9 | 0.00 | $0.69024 \times 10^{-4}$ | $-0.58050 \times 10^{-6}$ | $0.13772 \times 10^{-7}$ |

[Embodiment 3]

FIGS. 13 through 16 show the zoom lens system according to the third embodiment. This embodiment is applied to the zoom lens system having the lens-group moving paths shown in FIG. 19. FIG. 13 shows the lens arrangement of the zoom lens system. FIGS. 14A through 14D, FIGS. 15A through 15D, and FIGS. 16A through 16D respectively show aberrations of the lens arrangements at the short focal length extremity, at the intermediate focal length (f=70.0), and the long focal length extremity. Table 3 shows the numerical data of the third embodiment. The basic lens arrangement is the same as that of the first embodiment. The aperture stop S is positioned 1.0 mm behind the second lens group 20 (lens surface no. 8).

TABLE 3

$F_{NO} = 1:5.6$-$7.8$-$11.2$-$12.8$
$f = 28.50$-$70.00$-$105.00$-$118.00$
$W = 38.0°$-$17.1°$-$11.6°$-$10.4°$
$f_B = 8.14$-$42.46$-$71.70$-$82.50$

| Surface No. | r | d | $N_d$ | ν |
|---|---|---|---|---|
| 1 | −18.625 | 1.20 | 1.74330 | 49.3 |
| 2 | 85.254 | 1.93 | 1.66853 | 31.5 |
| 3 | −85.254 | 3.05-1.00-0.60-0.50 | — | — |
| 4 | 16.113 | 4.89 | 1.48749 | 70.2 |
| 5 | −10.202 | 1.50 | 1.84500 | 33.4 |
| 6 | −53.168 | 0.38 | — | — |
| 7 | 63.186 | 2.80 | 1.72750 | 40.3 |
| 8* | −16.306 | 11.42-4.60-2.81-2.42 | — | — |
| 9* | −97.305 | 2.69 | 1.58547 | 29.9 |
| 10 | −26.870 | 4.52 | — | — |
| 11 | −9.889 | 1.40 | 1.79137 | 47.2 |
| 12 | −96.573 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 8 | 0.00 | $0.71417 \times 10^{-4}$ | $-0.24347 \times 10^{-6}$ | $0.33799 \times 10^{-8}$ |
| 9 | 0.00 | $0.72743 \times 10^{-4}$ | $-0.27352 \times 10^{-6}$ | $0.10714 \times 10^{-7}$ |

Table 4 shows the numerical values of each condition of each embodiment.

TABLE 4

|  | Embodiment 1 | Embodiment 2 | Embodiment 3 |
|---|---|---|---|
| Cond. (1) | −0.651 | −0.654 | −0.654 |
| Cond. (2) | 1.696 | 1.522 | 1.509 |
| Cond. (3) | 9.050 | 19.890 | 17.760 |
| Cond. (4) | −3.661 | −3.761 | −3.821 |
| Cond. (5) | 0.093 | 0.093 | 0.089 |
| Cond. (6) | 0.759 | 0.759 | 0.759 |
| Cond. (7) | 4.140 | 4.140 | 4.140 |
| Cond. (8) | −18.682 | −19.598 | −20.546 |
| Cond. (9) | 0.144 | 0.159 | 0.160 |

As can be understood from Table 4, the numerical data of each of the first through third embodiments satisfy conditions (1) through (9). Furthermore, as can be seen in the aberration diagrams, the various aberrations at each focal length are sufficiently corrected.

According to the above descriptions, a three-lens-group zoom lens system for a compact camera, which can attain a high zoom ratio of 4.0 or more, can be obtained.

What is claimed is:

1. A zoom lens system comprising a negative first lens group, a positive second lens group, and a negative third lens group, in this order from an object;

wherein zooming is performed by moving said first through third lens groups in the optical axis direction;

wherein said negative first lens group comprises positive-and-negative cemented lens elements in which the most object-side surface is a concave surface; and wherein said zoom lens system satisfies the following conditions:

$-1 < r1/fW < 0$ $1.4 < f1G/f1N < 1.8$ wherein r1 designates the radius of curvature of the most object-side surface of said negative first lens group;

fW designates the focal length of the entire zoom lens system at the short focal length extremity;

f1G designates the focal length of said negative first lens group; and f1N designates the focal length of said negative lens element of said cemented lens elements.

2. The zoom lens system according to claim 1 satisfying the following condition:

$8 < \nu n - \nu p$ wherein

νn designates the Abbe number of said negative lens element of said cemented lens elements; and νp designates the Abbe number of said positive lens element of said cemented lens elements.

3. The zoom lens system according to claim 1 satisfying the following condition:

$-5 < fT/f1G < -3.5$ wherein fT designates the focal length of the entire zoom lens system at the long focal length extremity.

4. The zoom lens system according to claim 1 satisfying the following condition:

$0.03 < (d12W - d12T)/fW < 0.10$ wherein d12W designates the distance between said first lens group and said second lens group at the short focal length extremity; and d12T designates the distance between said first lens group and said second lens group at the long focal length extremity.

5. The zoom lens system according to claim 1 satisfying the following condition:

$0.6 < y/fW < 0.9$ wherein y designates the diagonal image height on a film surface.

6. The zoom lens system according to claim 1 satisfying the following condition:

$3.5 < fT/fw.$

7. The zoom lens system according to claim 1, wherein said positive second lens group comprises a lens element having at least one aspherical surface, and said aspherical surface satisfies the following condition:

$-30 < \Delta IASP < -10$ wherein

ΔIASP designates the amount of change of the spherical aberration coefficient due to said aspherical surface under the condition that the focal length of the entire zoom lens system at the short focal length extremity is converted (normalized) to 1.0.

8. The zoom lens system according to claim 1, wherein said negative third lens group comprises a lens element having at least one aspherical surface, and said aspherical surface satisfies the following condition:

$0 < \Delta VASP < 0.4$ wherein

ΔVASP designates the amount of change of the distortion coefficient due to said aspherical surface under the condition that the focal length of the entire zoom lens system at the short focal length extremity is converted to 1.0.

* * * * *